(12) United States Patent
Iskander et al.

(10) Patent No.: US 9,286,034 B2
(45) Date of Patent: Mar. 15, 2016

(54) APPLICATION DATAFLOW AWARE PROPERTY AND BINDINGS

(71) Applicant: Apple Inc., Cupertino, CA (US)

(72) Inventors: Alexis A. Iskander, Cupertino, CA (US); Mitchell B. Rivera, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/162,688

(22) Filed: Jan. 23, 2014

(65) Prior Publication Data

US 2015/0205582 A1 Jul. 23, 2015

(51) Int. Cl.
*G06F 9/44* (2006.01)

(52) U.S. Cl.
CPC ... *G06F 8/20* (2013.01); *G06F 8/70* (2013.01)

(58) Field of Classification Search
None
See application file for complete search history.

(56) References Cited

U.S. PATENT DOCUMENTS

| | | | |
|---|---|---|---|
| 5,416,719 A * | 5/1995 | Pribetich | 716/105 |
| 6,505,190 B1 * | 1/2003 | Harel et al. | 707/754 |
| 7,647,577 B2 * | 1/2010 | Wang et al. | 717/105 |
| 7,835,932 B2 | 11/2010 | Minsky et al. | |
| 8,307,112 B2 | 11/2012 | Dearle et al. | |
| 2005/0198623 A1 * | 9/2005 | Amin | H04N 21/443 717/144 |
| 2005/0289526 A1 * | 12/2005 | Wang et al. | 717/144 |
| 2006/0059461 A1 * | 3/2006 | Baker et al. | 717/113 |
| 2006/0074733 A1 * | 4/2006 | Shukla et al. | 705/8 |
| 2009/0064053 A1 * | 3/2009 | Crawford et al. | 715/854 |
| 2009/0070739 A1 * | 3/2009 | Philipp et al. | 717/116 |
| 2011/0004449 A1 * | 1/2011 | Rossignac | 703/2 |
| 2012/0143809 A1 | 6/2012 | Proctor et al. | |
| 2013/0174129 A1 * | 7/2013 | Grammel et al. | 717/136 |
| 2014/0258968 A1 * | 9/2014 | Brown et al. | 717/103 |

OTHER PUBLICATIONS

Rahul Singh, "Predico: Analytical Modeling for What-if Analysis in Complex Data Center Application", Proceedings of the 12th International Middleware Conference, pp. 120-139, Dec. 12, 2011.

* cited by examiner

*Primary Examiner* — Wei Zhen
*Assistant Examiner* — Daxin Wu
(74) *Attorney, Agent, or Firm* — Blakely, Sokoloff, Taylor & Zafman LLP

(57) ABSTRACT

In one embodiment, a non-transitory computer-readable medium stores instructions for implementing an application dataflow aware property and bindings system that implements two-way binding via a unidirectional directed acyclic graph and propagates data through the graph based on the connections between the graph nodes. In one embodiment, properties in a binding relationship are arranged in an upstream and downstream manner. Each property has an upstream node and a downstream node to send and receive messages from other properties. Where a first property is arranged upstream of a second property in the binding graph, the first property is more authoritative than the second property. The most upstream property is the truth for the binding. Requests to update the value of the property are propagated upstream via the upstream nodes and notifications of changes in the value of the property are propagated downstream via the downstream nodes.

20 Claims, 11 Drawing Sheets

APPLICATION DATAFLOW AWARE PROPERTY AND BINDINGS

BACKGROUND OF THE DISCLOSURE

Application development frameworks and programming languages known in the art provide binding mechanisms to facilitate synchronization of properties between data objects. A binding is an attribute of an object where a change in a property of one object is automatically reflected in properties of other objects. Bindings enable the synchronization of object properties to changes within, for example, a user interface or an underlying data store. Application Development frameworks that provide binding technology allow an application developer to synchronize properties, or other data elements, without requiring the application developer to implement extensive amounts of software to manually perform the synchronization. However, the generally known methods of implementing data bindings have shortcomings. The binding methods are not application data-flow aware, in that they do not take into account the desired direction of data-flow within the application. Accordingly, binding methods known in the art may introduce significant system processing overhead due to redundant updates, and may lead to cyclical update loops that can result in application crashes.

FIG. 1 is an illustration of data flow between synchronized data objects when using a two-way binding method to implement a variant of the model-view-controller design pattern, as is known in the art. The model-view-controller (MVC) design pattern assigns objects in an application to one of three roles: model, view, or controller. The pattern defines the roles objects play in the application and the way objects communicate with each other. The illustrated implementation of the MVC pattern binds a property storing a name string.

As illustrated, model.name 102 is the model object for the name property and controller.name 104 is the controller object for the name property. Objects for two separate views, (e.g., view1.name 106 and view2.name 108) are illustrated, which can be used within an application user interface to allow a user to view or manipulate a data object that represents the name property. In the example MVC system of FIG. 1, model.name 102 is bound with view1.name 106 and view2.name 108 via controller.name 104, where view1.name 106 and view2.name 108 are associated with text input fields displayed on a user interface. Data flow in a classical two-way binding implementation as known in the art may follow an update process where, in response to a user providing input a, for example the text field associated with view1.name 106, the name value at view1.name is changed, and view1.name 106 updates model.name 102 via the controller.name 104. After model.name 102 accepts the update, the model updates all bindings via controller.name 104, including both view1.name 106 and view2.name. Accordingly, an update to model.name 102 by view1.name 106 will trigger an update to both view1.name 106 and view2.name 108. The second update to view1.name 106 is an update "cycle" and is redundant. Repeated redundant updates increase data latency, which harms the responsiveness of the data processing system.

Additionally, an ambiguous relationship exists between the data objects and it may not be clear which objects contains the "true," or most authoritative value within the graph of the binding relationship. When implementing an MVC pattern, it is assumed that the developer has declared the "model" object as truth, but that declaration is conceptual, and is not incorporated within the dataflow.

SUMMARY OF THE EMBODIMENTS

In one embodiment, a non-transitory computer-readable medium stores instructions for an application dataflow aware property and bindings system that includes instructions to cause a processor at a client device to perform operations at a data node to receive a request to change a truth (e.g., the most authoritative value) of a property at the node and to determine whether the node that received the request is a truth node (e.g., a node of the most authoritative instance of the property). When the request-receiving node is the truth node, processing logic causes a change the truth of the property at the node and causes the node to propagate the truth to a downstream node. When the node is not the truth node, the processor causes the node to propagate the request to change the truth to an upstream node.

In one embodiment, each property includes an upstream node and a downstream node. The upstream node is to propagate requests to change the truth towards the truth. The downstream node is to propagate notifications of the truth. The property can be a resource provided by an application framework and can be bound to other resources. The request to change the truth of the property at the node can be received in response to a change at a user interface, or received in response to a request to programmatically change the value of the property from a resource that is bound to the property. In one embodiment, at least one of the downstream nodes can be stored on a server that is coupled with the processor and client device over the network, to enable the synchronization of the property between the server and the client.

In one embodiment, a computer-implemented method of propagating values between instances of a property within an application framework comprises providing a first instance of the property of the application framework. The first instance of the property includes a first upstream node and a first downstream node. The method additionally includes providing a second instance of the property of the application framework, where the second instance bound to the first instance, and the second instance includes a second upstream node and a second downstream node. The computer-implemented method further includes defining the second instance of the property as a truth node to store the most authoritative value of the property. The method further includes, at the first instance of the property, receiving a message including a requested value for the property, and then transmitting to the second instance of the property, a request to set the truth to the requested value via the first upstream node. The method further includes, at the second instance of the property, receiving the request to set the truth to the requested value, setting the truth to the requested value, and then transmitting a notification of the truth to the first instance via the second downstream node.

In one embodiment, the method further includes a third instance, which receives the notification of the truth from the second instance, and in response to receiving the notification of the truth, sets an instance specific value to the truth. In one embodiment, a data processing device comprising memory and a processor executes instructions included in the non-transitory computer-readable medium described above. In one embodiment, the data processing device stores instructions, which when executed by the processor, cause the processor to perform the computer-implemented method described above.

The above summary does not include an exhaustive list of all aspects of the embodiments. It is contemplated that the embodiments include all systems and methods that can be practiced from all suitable combinations of the various aspects summarized above, and also those disclosed in the detailed description below.

BRIEF DESCRIPTION OF THE DRAWINGS

The accompanying drawings are provided to illustrate the various embodiments. It is to be noted that the following description and drawings are illustrative of the embodiments and are not to be construed as limiting. Reference to "one embodiment" or "an embodiment" means that a particular feature, structure, or characteristic described in conjunction with the embodiment can be included in at least one embodiment. The appearance of the phrase "in one embodiment" in various places in the specification do not necessarily refer to the same embodiment.

In the figures of the accompanying drawings in which like references indicate similar elements, and in which.

Figure 1:
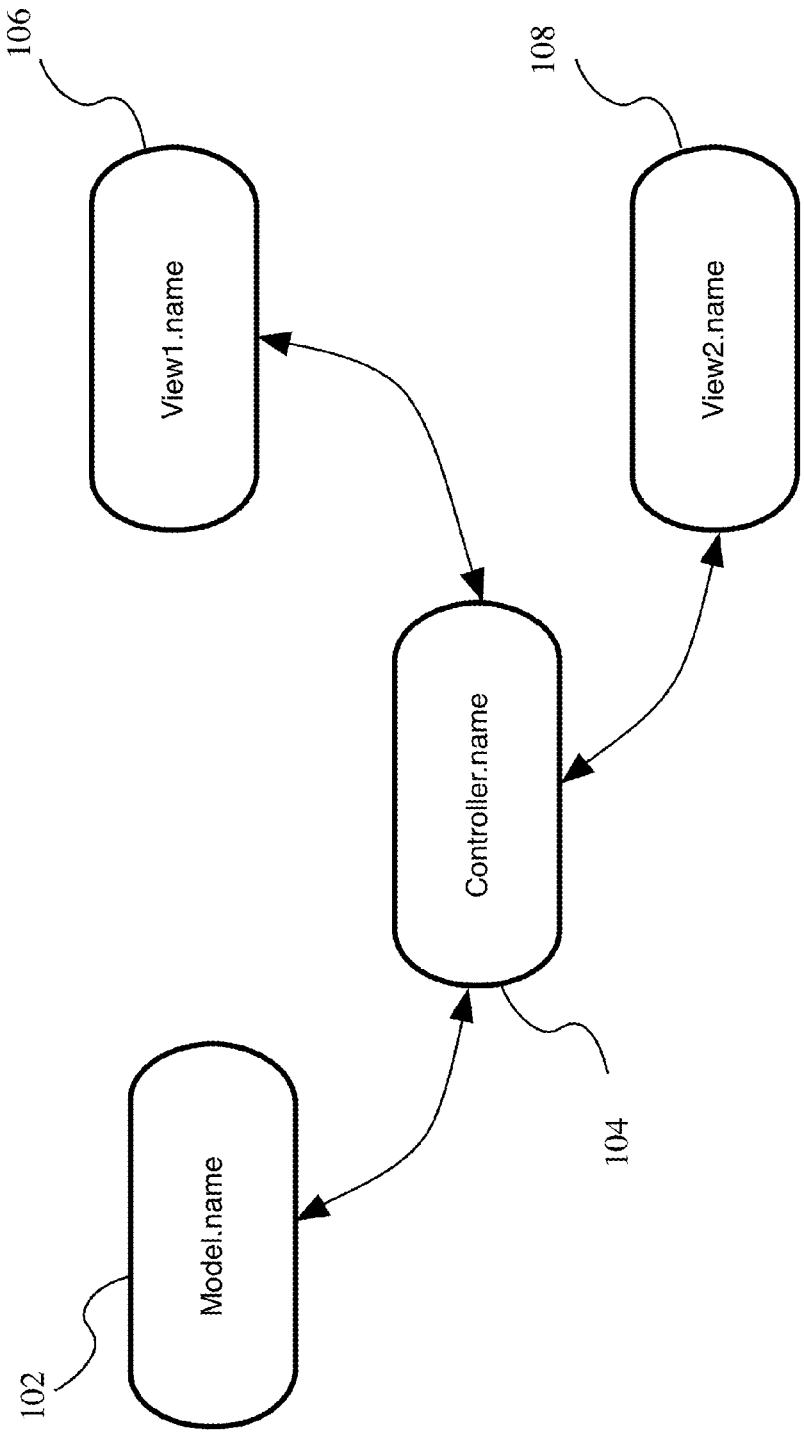
FIG. 1 is an illustration of data-flow between synchronized data objects when using a two-way binding method to implement a variant of the model-view-controller design pattern, as is known in the art.

Other features will be apparent from the drawings listed above, and from the detailed description, which follows.

DETAILED DESCRIPTION

Described herein is an application dataflow aware property and bindings system that implements two-way data bindings in a directed, acyclic manner that avoids redundant updates. The embodiments will be described along with additional descriptive and enabling details to provide a thorough understanding of various embodiments. In certain instances well-known or conventional details are not described in order to provide a concise discussion. Additionally, some elements of the embodiments are illustrated using object oriented design patterns as known in the art. The use of such design patterns is illustrative, and not intended to limiting.

An embodiment of the property and bindings system can be implemented using a dataflow architecture that expresses an application's data (e.g., properties, bindings, and data transformations) as a directed acyclic graph and propagates data through the graph in an ordered, predictable way, based on the connections between the graph nodes. Each node can have any number of parent or child nodes, where the nodes transmit data to their respective child nodes and receive data from their parent nodes. In two-way binding as known in the art, the binding system is aware that a change has taken place, but does not have any context information as to source of the change. The lack of information as to the source of a change can lead to redundant and cyclical updates.

The property and binding system avoids redundant or cyclical updates by utilizing a concept of "upstream" and "downstream," where upstream is closer to truth for the binding and downstream is further away from truth. Each instance of a bound property has an upstream node and a downstream node. In one embodiment, upstream instances of a property are more authoritative than downstream instances, such that a first property or instance of a property that is bound upstream of a second property or property instance, the first property or instance is considered more authoritative than the second property or instance. In such embodiment, the most authoritative (e.g., most upstream) property is the truth. In one embodiment, the truth is the definitive value of the property within in the binding relationship, and all instances of the property are updated to reflect this value. Change requests for the property value propagate upstream towards the truth property or instance. If the truth instance accepts the request and updates the truth, a notification of the update is sent through a chain of downstream nodes for each bound property.

In one embodiment, cycles and redundant updates can be avoided by performing a reverse dependency analysis on the graph of the upstream and downstream nodes created by the binding arrangement, creating the functionality of a classical property and bindings system using a formalized graph model. A queue of nodes is generated for processing, and a node is not queued for processing if it is already in the queue. Subsequently, the queue is flushed, where each queued node is instructed to push data to each of the node's children, where upstream nodes push requests to change the truth to child upstream nodes, and downstream nodes push notifications of a change in the truth to child downstream nodes.

Exemplary Property and Binding Data Flow Between Nodes

Figure 2:
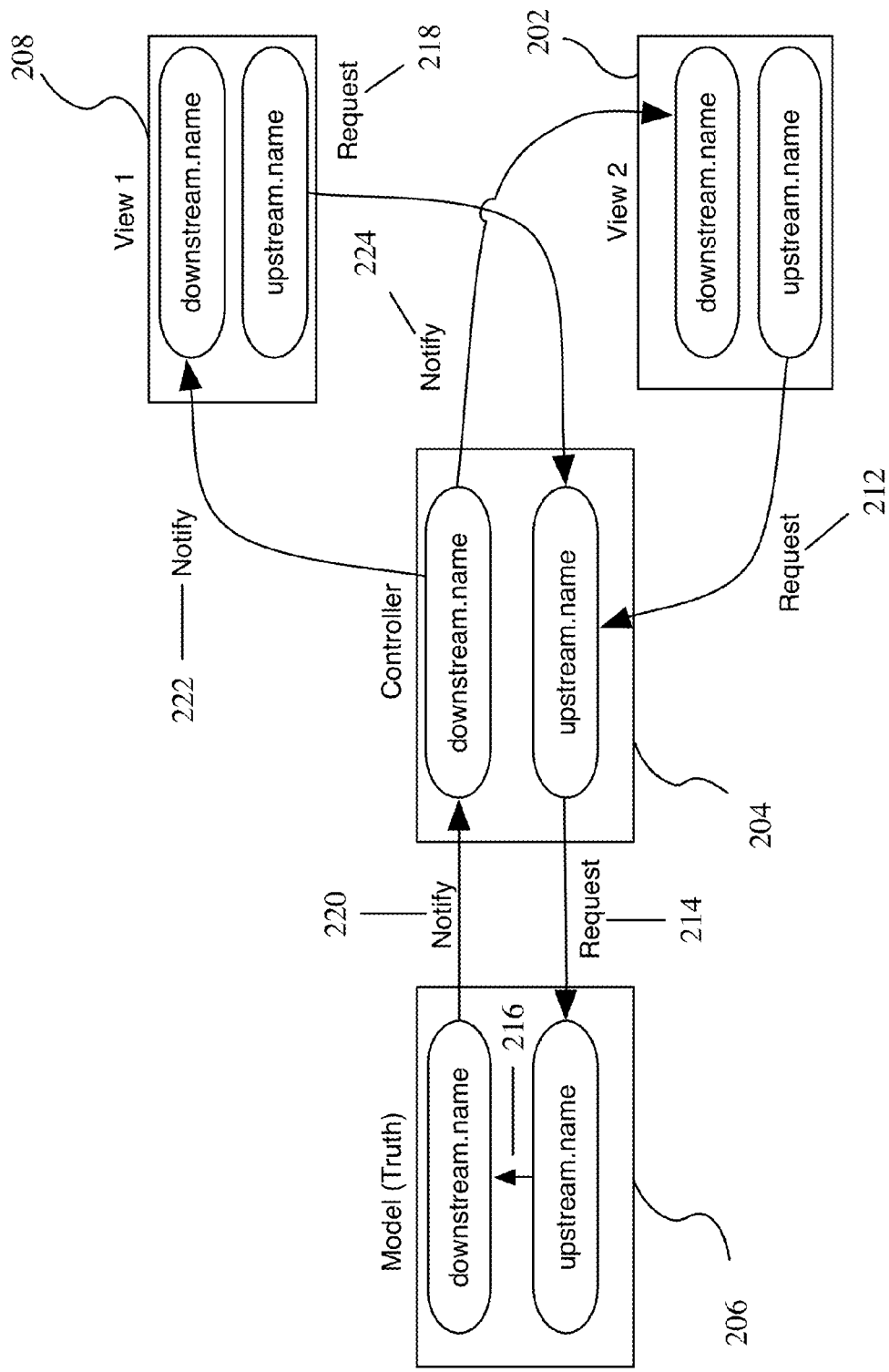
FIG. 2 is an illustration of dataflow aware binding according to an embodiment.

FIG. 2 is an illustration of application dataflow aware binding according to an embodiment. The embodiment is illustrated using a model-view-controller design pattern to show dataflow at a user interface (UI) element that displays and edits a property. Four instances of the property are shown, in which a view2 instance 202 provides a view of the property to a UI element, a controller instance 204, mediates access to the model for the view instances, a model instance 206, which is, in one embodiment, designated as the truth for the property or, in one embodiment, contains the most authoritative value of the property. A view1 instance 208 provides an additional view of the property, which can be viewed with or separate from the UI element that displays view2 202. In one embodiment, either one of view1 208 or view2 202 can be displayed, for example, within an application that is displayed via a web interface, an application that is executed on a single client device, or an application executed on multiple client devices.

Each of the property instances illustrated includes an upstream node and a downstream node. A request to set or change the value of the property at the UI element can be received which triggers an additional request that is subsequently received at view2.upstream.name, the upstream node of view2 202. Instead of setting the requested value at view2 202, the request 212, including the requested value, is propagated via the view2.upstream.name node to the controller.upstream.name node at the controller instance 204. The controller.upstream.name node at the controller 204 propagates the change request 214, which is transmitted or relayed to model.upstream.name at the model instance 206.

The model instance 206 of the property is designated as truth in the exemplary illustration or contains the most authoritative value of the property. In one embodiment, when the request 214 is received at the model instance 206 of the property that has been designated as truth, the authoritative value for the property is set. In one embodiment, setting the truth at the truth node creates a dataflow bridge 216 between the set of upstream nodes and the set of downstream nodes, which otherwise are functionally separate. In such embodiment, data flow between an upstream node and a downstream node for a property occurs only in response to setting the truth at the truth node. This restriction on data flow assists in the avoidance of update cycles.

In response to setting or deriving the truth for the property, a notify message (e.g., 220, 222, and 224) is propagated throughout the instances. The notify messages 220, 220, 224 each contain the new value for the property. In one embodiment, before the value included within the request 214 is set as the truth, the value is validated against a set of validation criteria that have been set for the property. In one embodiment, the instance of the property that initially requested the change is not updated until a notification (e.g., notify message 222 or 224) with the new value is received. For example, a value change request received at view1 208 or view2 202 may not result in an immediate update. Instead, a request 218 for view1 208 or a request 212 for view2 202 can be sent upstream, and the view value of the property at view2 202 is not changed until a notification of the new truth is received via a notify message 224. Additionally, view1 208 can be updated only when a notify message 222 is received at the downstream node of view1 202. In one embodiment, the truth received at a downstream node of a view instance of a property can differ from the value initially requested by instance.

Figure 3:
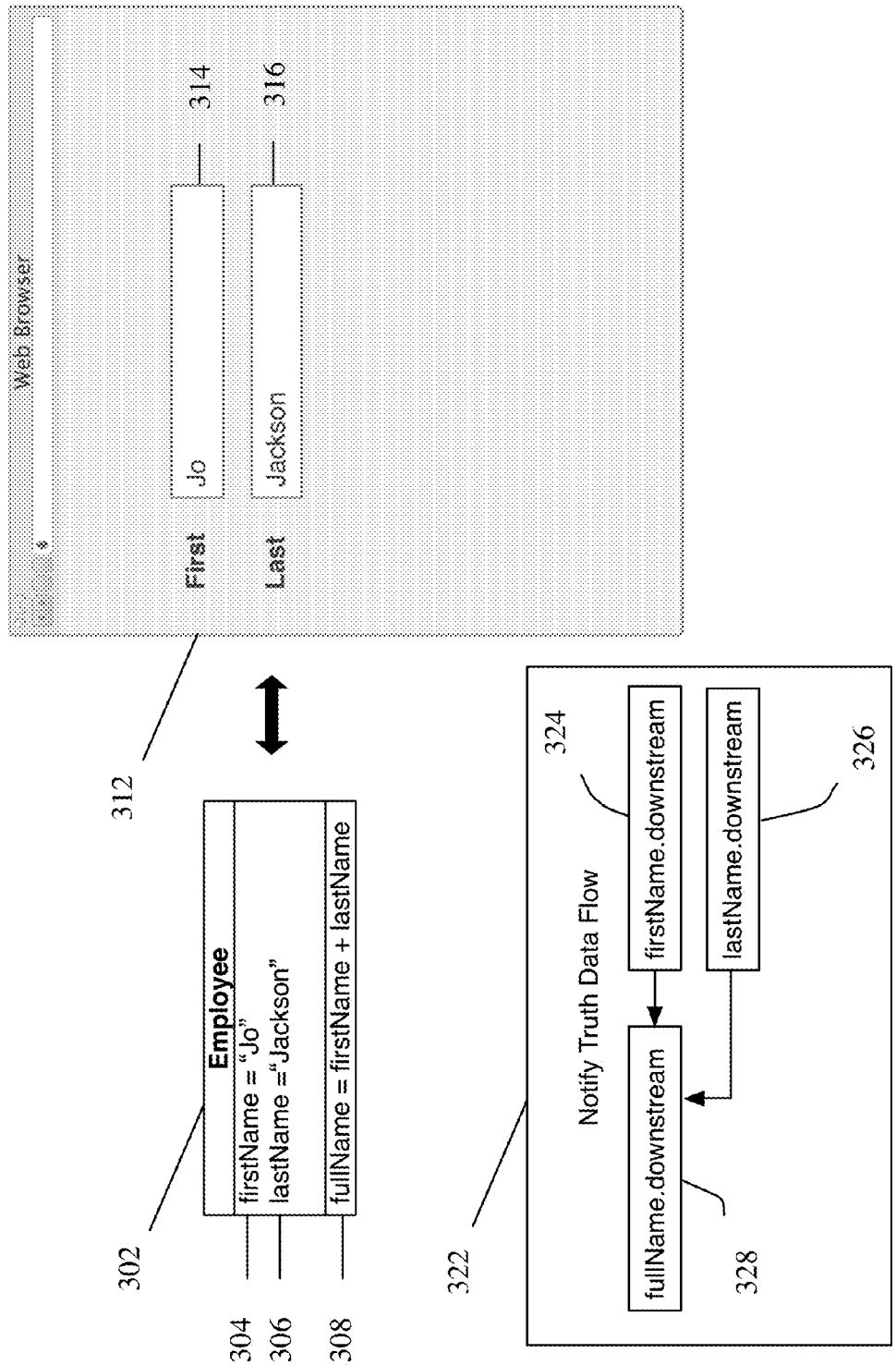
FIG. 3 is an illustration of property and bindings at a user interface according to an embodiment.

FIG. 3 is an illustration of a property and bindings system at a user interface according to an embodiment. An exemplary employee object 302 can include a firstName 304 and a lastName 306 property, as well as a fullName 308 property that is derived from and depends on both firstName 304 and lastName 306. The firstName 304 and lastName 306 properties are associated with a first name text field 314 and a last name text field 316. As illustrated, the fullName property 308 of the employee object 302 depends on both the firstName property 304 and the lastName property 306.

In one embodiment, the association between the text field and the name properties is facilitated by an application framework provided by an operating system vendor, and can be implemented using, for example, the MVC design pattern. The framework can provide an interface in which a user enters text into the first name text field 314 and, in response to the text entry, a request to update the firstName property 304 is propagated to the truth via upstream nodes as illustrated in FIG. 2. Likewise, a user can enter text into the last name text field 316, and in response to the text entry, a request to update the lastName property 306 is propagated to the truth via upstream nodes.

In the example shown at graph 322, fullName.downstream 328 is has two parent nodes, firstName.downstream 324 and lastName.downstream 326. In response to setting the value at the truth node for firstName 304, a notification is sent from firstName.downstream 324 to all downstream nodes that are bound to and depend on, firstName 304 (e.g., fullName.downstream 328). In response to setting the value at the truth node for lastName 306, notification of the truth is sent from a lastName.downstream node 326 to the fullName downstream node 328. In one embodiment, if firstName 304 and lastName 306 are both updated within the same update cycle, only one notification is sent to fullName.downstream 328, which includes updates from both bindings. For example, an embodiment of a controller node for fullName.downstream 328 can consolidate all updates into a single update containing all relevant truths, to reduce the number of processing events.

Figure 4:
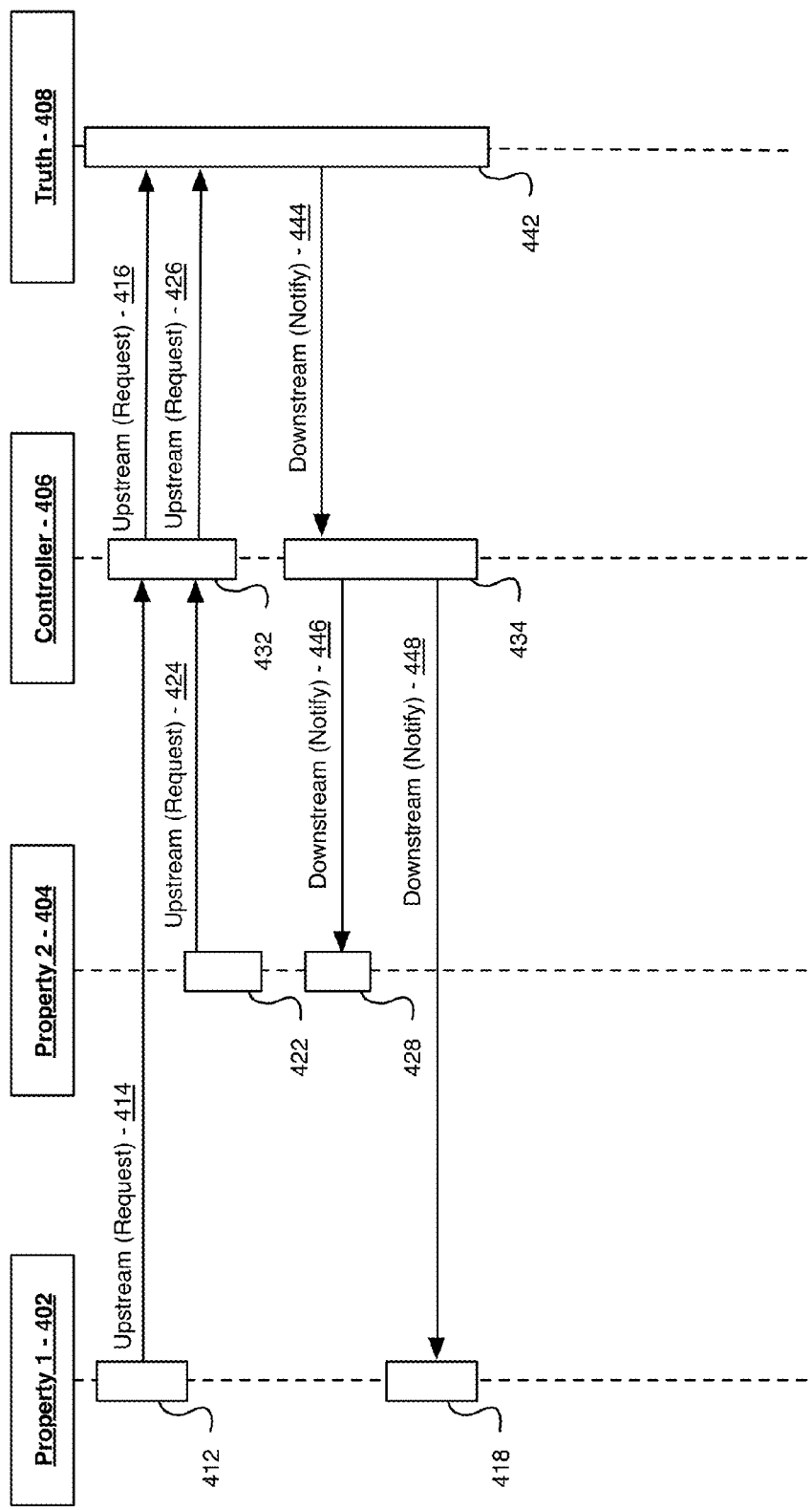
FIG. 4 is a sequence diagram of binding message flow according to an embodiment.

FIG. 4 is a sequence diagram of binding message flow according to an embodiment. In the illustrated binding arrangement, a first property 402 has a two-way binding to a second property 404 via a property controller 406, which interfaces with a data-store 408 that has been previously designated as truth. In one embodiment, the first property 402 and the second property 404 are instances of the same property. In one embodiment, the first property 402 and the second property 404 have a complex binding, where one property is derived from the other. In one embodiment, the data flow illustrated is arbitrated by a binding algorithm, which updates bound properties within data objects on a data processing system. In one embodiment, the objects include integrated message passing and receiving functionality. In one embodiment, the represented properties 402, 404 implement view instances in an MVC pattern. In one embodiment, the represented properties 402, 404 implement model or controller instances of separate properties.

In one embodiment, an attempted change to the value of the first property 402 causes an upstream node 412 associated with the first property 402 to transmit an upstream request 414 to the upstream node 432 of the controller 406. The upstream request 414 is propagated by the upstream node 432 of the controller 406 as an upstream request 416, which is received at a truth node 442 of the truth 408. Likewise, in one embodiment, an attempted change to the value of the second property 404 causes an upstream node 422 associated with the second property 404 to transmit an upstream request 424 to the upstream node 432 of the controller 406. The upstream request 414 is propagated by the upstream node 432 of the controller 406 as an upstream request 426, which is also received at a truth node 442 of the truth 408.

In one embodiment, the truth 408 includes a truth node 442 that is logically both an upstream node and a downstream node, although other implementations are possible. When an upstream request (e.g., request 416, or request 426) arrives at the truth node 442, processing logic can perform a validation algorithm using validation criteria that define the acceptable set of values for the property before accepting the request and setting or modifying the truth for the property. Validation is discussed in further detail in FIG. 5.

In one embodiment, multiple requests (e.g., request 416 and request 426) that received concurrently or within a specific period are resolved such that only a notify 444 message is dispatched. In one embodiment, the multiple requests are arbitrated by time of receipt, such that only the first or last upstream request for a property is accepted. In one embodiment, the requests carry a relative priority, such that a higher priority message is accepted over a lower priority message. In one embodiment, the value of the request is considered, such that only the highest value is accepted.

In one embodiment a binding arrangement exists such that multiple non-conflicting updates are resolved as truth, and single a consolidated notification is transmitted to all nodes downstream from the truth. For example, the truth 408 can be a separate but dependent property of the first property 402 and the second property 404 (e.g., as in FIG. 3, where the truth 408 is fullName 308, the first property 402 is firstName 304, and the second property 404 is lastName 306). A first request 416 to update the truth 408 can include a new first name, while a second request 426 can include a new last name. An embodiment can derive a new full name at the truth 408 and send a single notify message 444 downstream to a downstream controller node 434. The downstream controller node 434 can then propagate a notify message 446 containing the updated truth to a downstream node 428 associated with the second property 404, and propagate a notify message 448 to a downstream node 418 associated with the first property 402. In one embodiment (not shown) the first property 402 and second property 404 are directly bound to truth 408.

Exemplary Logic Flow Diagrams

Figure 5:
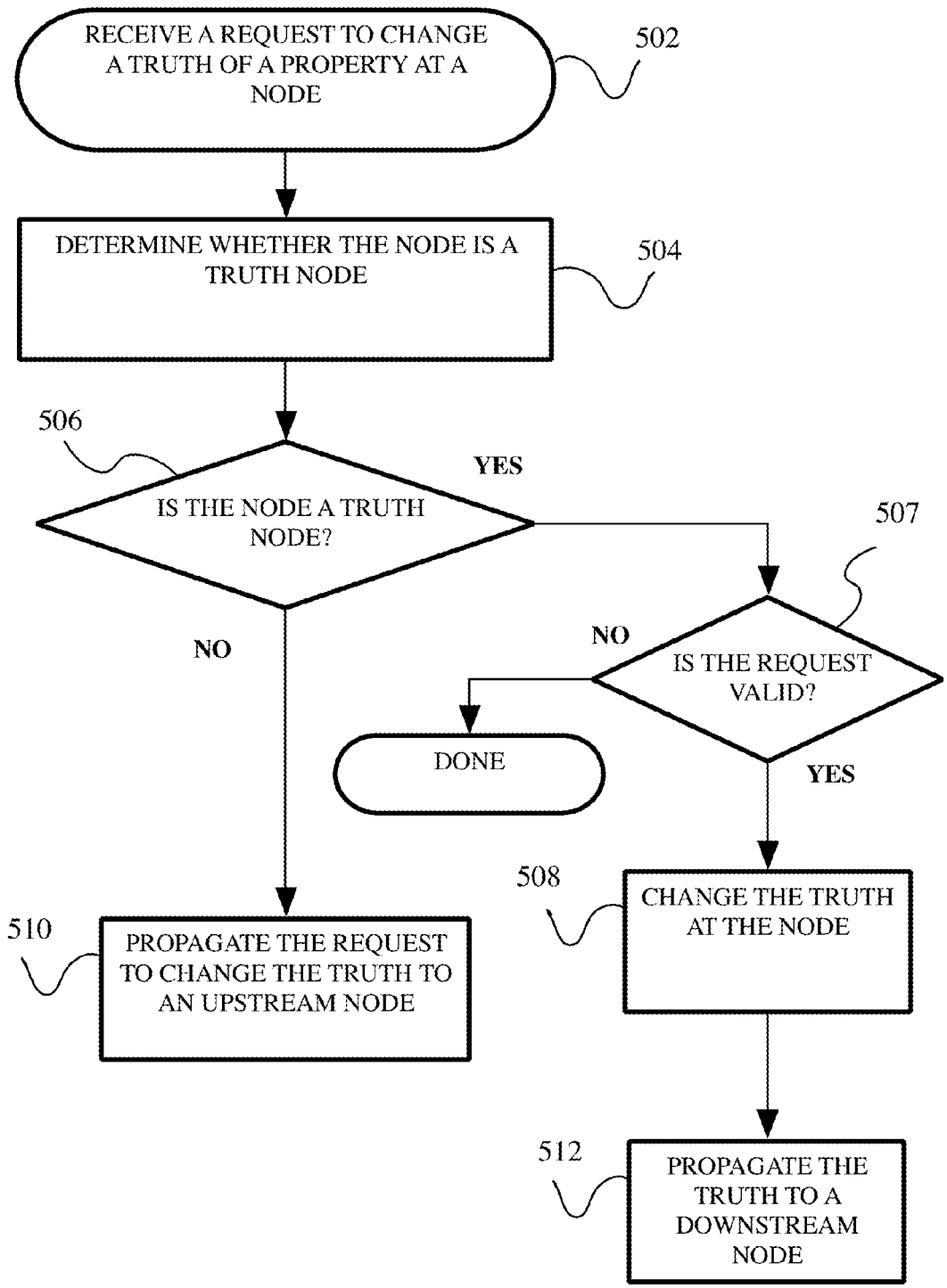
FIG. 5 is a flow diagram of one embodiment of a method of processing requests to update the truth of a property at a node.
Figure 6:
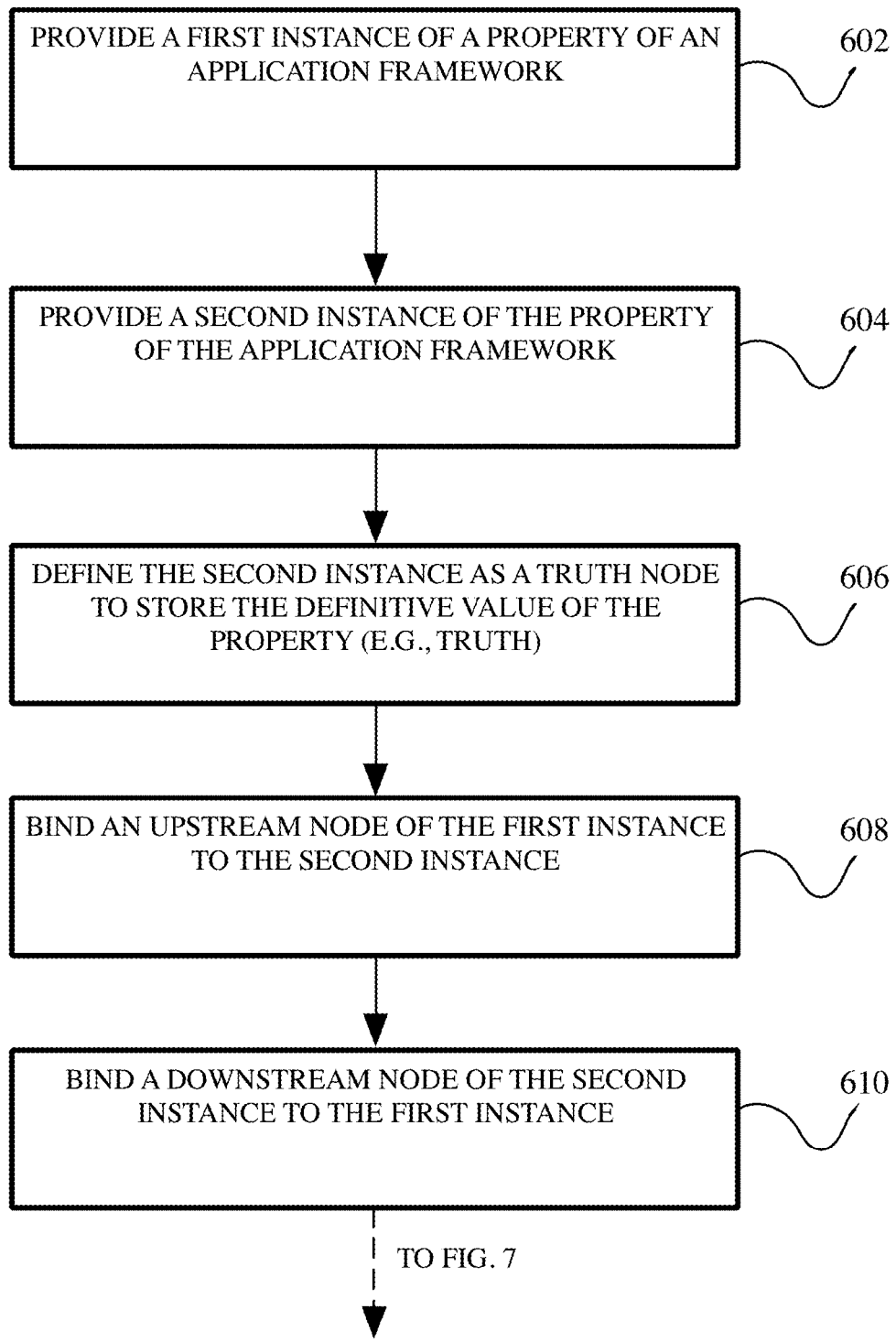
FIG. 6 is a flow diagram of one embodiment of a method of performing application dataflow aware property bindings via an application framework.
Figure 7:
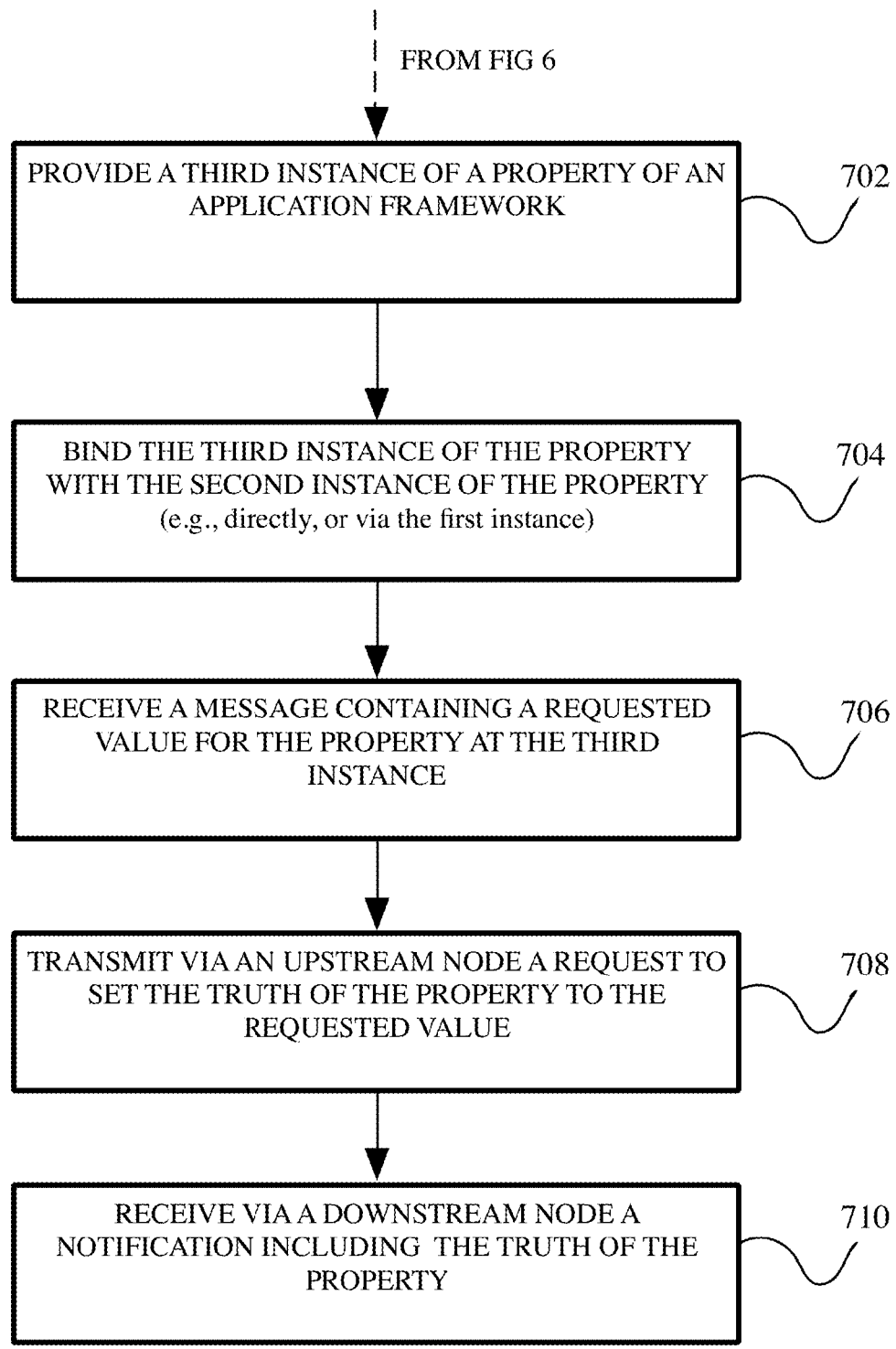
FIG. 7 is a block diagram of additional operations for an embodiment of application dataflow aware property bindings within an application framework.

FIGS. 5-7 are flow diagrams illustrating exemplary logic employed to implement the various binding relationships and node operations described herein. Each instance of the property can include processing logic, or the processing logic can be stored external to the instance. The processing logic described comprises hardware (e.g. circuitry, dedicated logic, etc.), software instructions on a non-transitory machine-readable storage medium, or a combination of both hardware and software instructions. Some of the processes are described below in terms of sequential operations. However it should be appreciated that some of the operations described may be performed in a different order, or in parallel rather than sequentially.

FIG. 5 is a flow diagram of one embodiment of a method of processing requests to update the truth of a property at a node. A given node can receive a request to change a truth (e.g., the most authoritative value) of a property at the node, as shown at block 502. At block 504, an operation is shown which determines whether the node that received the request is a truth node. In one embodiment, the truth node is the upstream node of the most authoritative property or instance of the property. As shown at block 506, when the node is not the truth node, processing logic causes the node to propagate the request to change the truth upstream to an upstream node of a more authoritative property or instance of the property, as shown at 510. When the request-receiving node is the truth node, the processing logic causes a change to the truth at the node, as shown at block 508. In one embodiment, changing the truth at the node causes a change to the most authoritative property. In response, a notice containing the updated truth is propagated to a downstream node, as shown at block 512. The notices continue to propagate downstream via the various downstream nodes of the properties in the binding relationship.

As shown in block 507, an embodiment can include processing logic to determine whether the request to change the truth is a valid request. A request can be validated based on a set of criteria that define the acceptable set of values for the property. Validation criteria can be pre-defined by the software developer, or included as a default element of the application framework. Validation criteria can include whether the request is within a data range, or includes a value of a certain data type, or can include more complex criteria such as whether an update to the truth has been made within a previous time period, whether a timestamp of a request is older or newer than a timestamp assigned to the current value, or whether the requested value is less than or greater than the currently set value.

For example, in one embodiment, a game application that tracks the highest game level achieved by a user can define validation criteria requiring new values for the property to be higher than old values. In one embodiment, an application displaying a UI slider element to change a property containing, for example, an RGB value for the interface can use application framework provided validation to limit the set of acceptable values to within a particular range. In one embodiment, as shown at block 507, an incoming request to the truth node that includes a value that is outside of an acceptable value range is rejected, or otherwise not serviced, and processing ends for that request without sending an associated notification of a change of the truth.

FIG. 6 is a flow diagram of one embodiment of a method of performing application dataflow aware property bindings via an application framework. In one embodiment, a binding relationship is formed using objects provided by an application framework. The application framework can be one of any number of application frameworks designed to provide application developers with toolkits and software libraries to access specific functionality provided by a service provider. For example, the application framework can be a user interface framework, such as the Application Kit framework or the UI Kit framework, each provided by Apple Inc. of Cupertino California, which provide objects with which developers can implement a graphical, event-driven user interface. The application framework can also be a data services framework that facilitates, in one embodiment, synchronous cloud base storage across multiple devices using, for example, iCloud storage, also provided by Apple Inc.

As shown at block 602, the application framework can include data and instructions to provide a first instance of a property, for example, in a first instance of an object having the property. As shown at block 604, the data and instructions of the application framework can operate to provide a second instance of the property, for example, in a second instance of the object having the property. As shown at block 606, a mechanism is available to define the second instance as a truth node for the binding arrangement, to store the most authoritative value of the property. At block 608, the instructions cause processing logic to bind an upstream node of the first instance of the property to the second instance. At block 610, the instructions cause processing logic to bind a downstream node of the second instance to the first instance.

A two-way binding is created between the first instance and the second instance using unidirectional bindings, such that an attempt to update to the first instance triggers a request via the upstream node of the instance. The first instance updates its understanding of the truth for the binding only in response to a notification of a new truth from the designated truth node which, in this example, is the second instance. The illustrated binding is a two-way, such that the first instance will update in response to a notification of the truth received from the second instance under circumstances in which the first instance did not request the update, such as in an MVC pattern in which the first instance is a first view, the second instance is a model, and the model is updated by a third instance used as a second view.

FIG. 7 is a block diagram of additional operations for an embodiment of application dataflow aware property binding within an application framework. As shown at block 702, an additional operation providing a third instance of the property can be performed. Processing logic can then perform an operation to bind the third instance of the property to the second instance, as shown at block 704. In other words, the upstream node of the third instance is bound, or otherwise made aware of the second instance, and the downstream node of the second instance is bound, or otherwise made aware of the third instance.

The binding between the third instance of the property and the second instance of the property can route through the first instance of the property, as in an MVC pattern in which the third instance is a view, the first instance is a controller and the second instance is a model. Alternatively, the binding can be directly between the second instance and the third instance. Notwithstanding the binding arrangement, when a message containing a requested value for the property is received at the third instance, as shown at block 706, a request including the requested value is transmitted via the upstream node of the third instance, as shown at block 708. In one embodiment, the requested value is not considered to be set until, as shown at block 710, the downstream node receives a notification containing an updated truth for the property.

Exemplary Software Architecture

Figure 8:
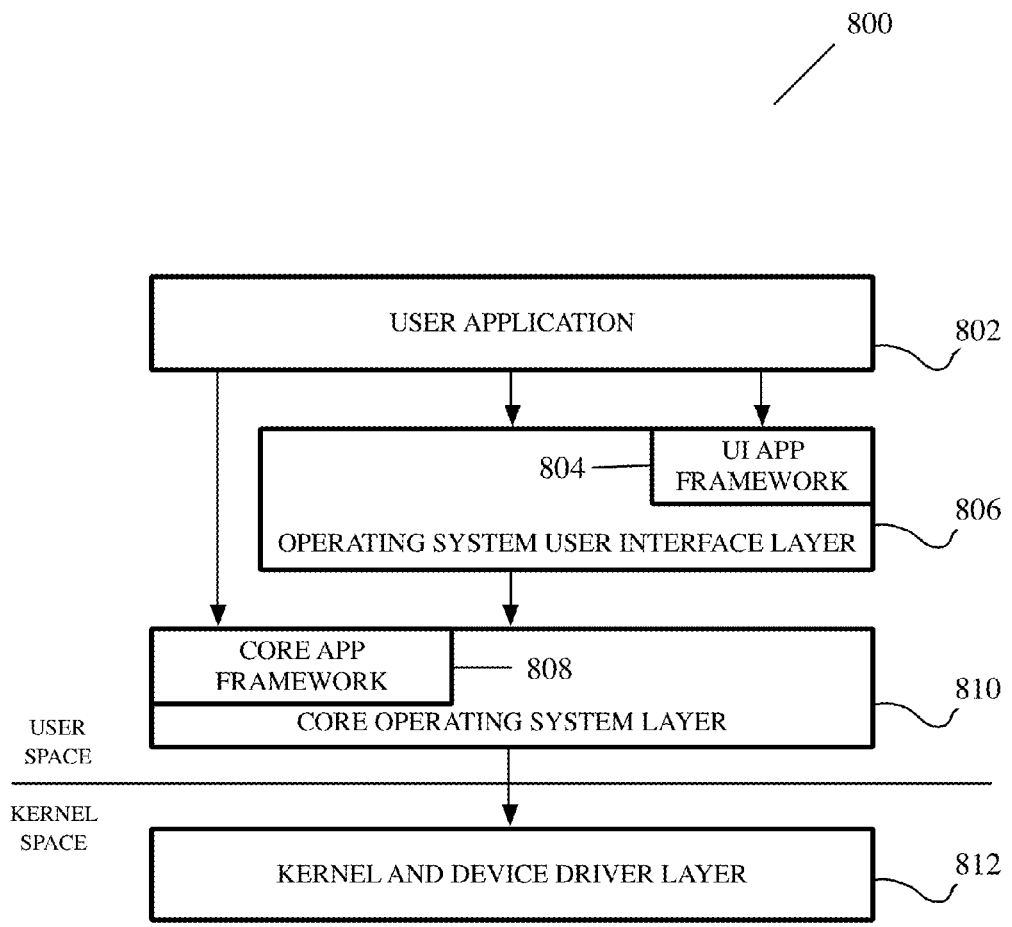
FIG. 8 shows a software architecture including a set of exemplary application frameworks that can make use of an embodiment of the application dataflow aware property and binding system.

FIG. 8 shows a software architecture including a set of exemplary application frameworks that can make use of an embodiment of the application dataflow aware property and binding system. The various software components of the exemplary software architecture can be stored in a combination of volatile and non-volatile memory during the execution of the software components. When the components are not being executed they are stored in non-volatile storage such as a magnetic hard drive or semiconductor memory (e.g., flash, etc.). During application development, a software developer can make use of an operating system vendor provided application framework that includes a set of application programming interfaces (API) that enable the developer's application to make use of services provided by the vendor's operating system to user applications.

The software components are illustrated with a division between user space and a kernel space. Although other arrangements are possible, user applications (e.g., user application 802), and some operating system components (e.g., operating system user interface layer 806, and core operating system layer 810) execute in user space. In kernel space, the operating system kernel and a set of device drivers operate in the kernel and device driver layer 812. The kernel and device driver layer 812 manage the underlying functionality of the operating system and provide a formalized and secure mechanism for user space software to access data processing system hardware.

A user interface (UI) application framework 804 provides a mechanism for the user application 802 to access UI services provided by the operating system (OS) UI layer 806. Underlying operating system functions that are not related to the user interface are performed in the core operating system layer 810. One or more data management frameworks 808 may be available to a user application to access the core operating system functions.

The exemplary user application 802 may be any one of a plurality of user applications, such as a web browser, a document viewer, a picture viewer, a movie player, a word processing or text editing application, an email application, or other applications known in the art. The user application 802 accesses instructions in an exemplary UI app framework 804 for creating and drawing user interface objects, such as buttons, windows, dialogs, controls, menus, and other user interface elements and components as are known in the art. The UI application framework 804 also provides additional functionality including menu management, window management, and document management, as well as file open and save dialogs and copy-and-paste handling. The exemplary UI app framework 804 implements an embodiment of the application dataflow aware property and binding system described herein to enhance the efficiency of dataflow among the various property bindings used during execution of instructions provided by the framework.

The core operating system layer 810 contains operating system components that implement features including and related to application security, system configuration, graphics and media hardware acceleration, and directory services. Multiple application frameworks, such as the core app framework 808 provide a set of APIs to enable a user application 802 to access core services that are essential to the application, but are not directly related to the user interface of the application. The core app framework 808 can facilitate an application's access to database services, credential and security services, backup services, data synchronization services, and other underlying functionality that may be useful to an application.

For example, using a core app framework 808, an application can provide functionality that allows a user application to automatically synchronize application content between multiple client devices. The core app framework 808, or equivalent application frameworks, can provide access to remote server based storage for functionality including synchronized document storage, key-value storage, and database services. Document storage synchronization allows a user application 802 to access a common data store containing user-visible file-based content from multiple devices. Key-value storage allows a user application 802 to share small amounts of data such as user preferences or bookmarks among multiple instances of the user application 802 across multiple client devices. The user application 802 can also access server-based, multi-device database solutions via the core app framework 808.

Figure 9:
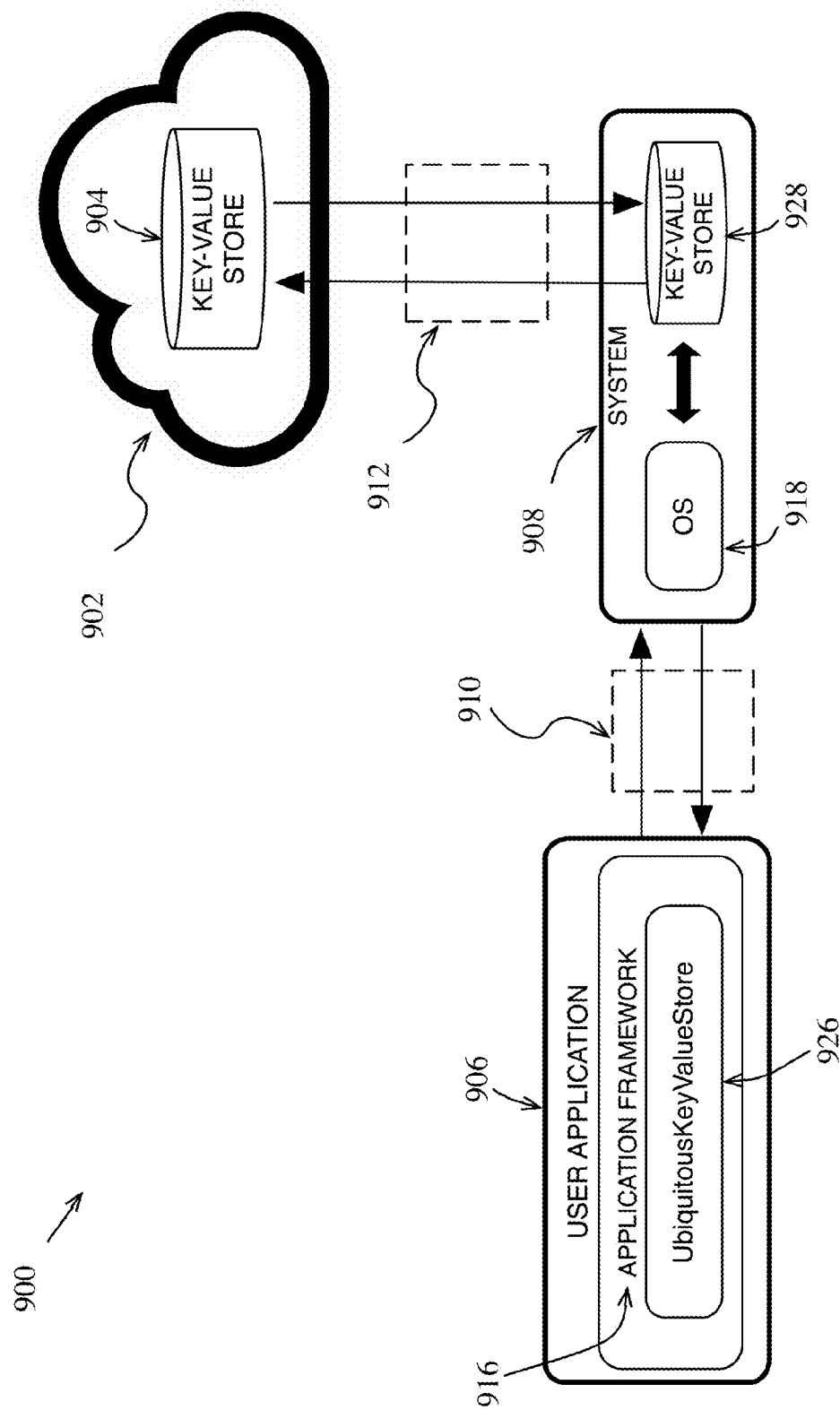
FIG. 9 shows a software architecture including an exemplary application framework that can make use of an embodiment of the application dataflow aware property and binding system for remote data synchronization.

FIG. 9 illustrates software architecture including an exemplary application framework that can make use of an embodiment of the application dataflow aware property and binding system for remote data synchronization. The exemplary software architecture 900 includes a user application 906 developed using an application framework 916 that enables the synchronization of properties using a ubiquitous key-value store 926. The user application 906 executes on a data processing system 908, which includes an operating system 918 and a local key-value store 928. In one embodiment, the local key-value store 928 of the data processing system 908 is synchronously bound with a cloud based distributed file storage system 902 that stores a remote version of the key-value store 904, although an asynchronous binding is also possible. Properties used by the user application 906, may be stored in the ubiquitous key-value store 926, which is persistent across multiple instances of the user application 906 when executing on multiple client devices. Requests and notifications can be passed via message channel 910 and message channel 912, which each can be one of several local or remote message passing mechanisms for software communication and synchronization.

The dataflow of the synchronization for the ubiquitous key value store 926 can be performed using one or more embodiments of application dataflow aware property and binding as described herein. A first instance of a property can be stored in the ubiquitous key-value store 926, which is managed by the user application 906, a second instance of the property can be stored in the key-value store 928 of the data processing system 908, which is managed by the operating system 918, and a third instance of the property can be stored in the remote key-value store 904 on a distributed storage system. Each instance of the property is bound to another instance of the property, and each instance includes an upstream node to send requests to set, change, or update the truth of the property, and a downstream node to receive notifications of the truth of the property.

In the exemplary software architecture 900, the path of the property binding dataflow is defined based on which of the instances of the property is designated the truth for the property. In one embodiment, the truth is designated as the key-value store 928 of the data processing system 908. In such embodiment, a change to the property at the user application 906 will trigger the transmission of a request to change the truth of the property to be transmitted over a message channel 910 via the upstream node of the instance. The instance of the property at the key-value store 928 of the data processing system 908 receives the request and, in one embodiment, validates the request based on a set of validation conditions (e.g., data range, data type, etc.) before setting the truth to the requested value. Subsequently, a notification including the new truth is transmitted via the downstream node of the property at the key-value store 928 over message channel 910 and message channel 912. After receiving the notification via their respective downstream nodes, the value stored at the remote key-value store 904, and the value reflected in the ubiquitous key-value store 926 provided to the user application 906 via the application framework 916 is changed to the new value.

Alternatively, an embodiment may designate the key-value store 904 of the remote storage system 902 as the truth. In such embodiment, when a request that is received at the upstream node of the property stored in the key-value store 928, the instance propagates the request to the key-value store 904 of the remote storage 902 over message channel 912. Additionally, a notification of the truth received at the downstream node of the instance of the property stored in the key-value store 928 can be propagated to the instance of the property used by the user application 906 over message channel 910.

Although the application aware property and binding system is described in conjunction with the exemplary software architectures illustrated, it will be understood that the methods and systems described will have broad application to data binding and synchronization on data processing systems.

Exemplary Data Processing Systems

Figure 10:
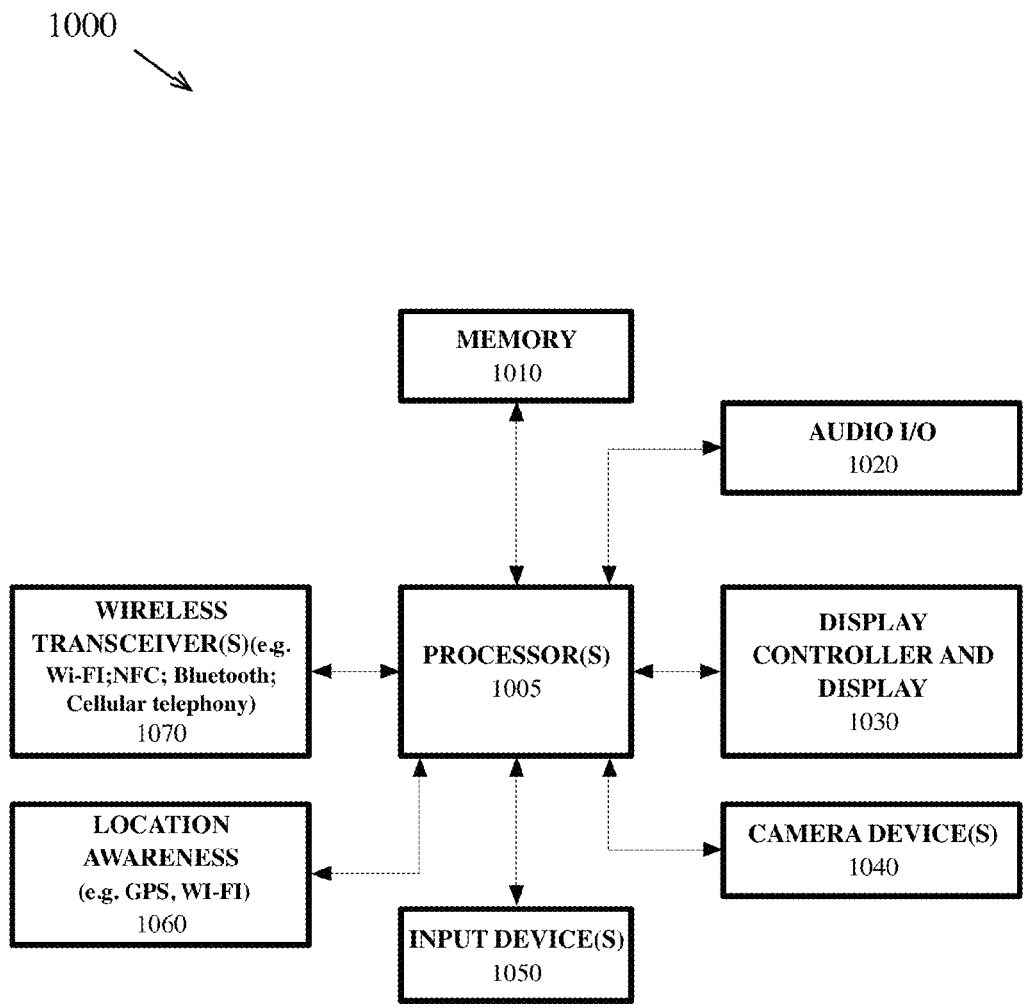
FIG. 10 is a block diagram illustrating a data processing system that can be used in an electronic device according to an embodiment.

FIG. 10 is a block diagram illustrating a data processing system 1000 that can be used in an electronic device, according to an embodiment. The exemplary data processing system illustrated can be any handheld or mobile computing device, such as a variant of the iPhone, iPad, or iPod Touch device, all from Apple Inc. of Cupertino, California. The data processing system 1000 includes a processing system 1005 with one or more microprocessors. The system 1000 also includes memory 1010 for storing data and programs for execution by the processing system. The system 1000 additionally includes an audio input/output subsystem 1020 that may include a microphone and a speaker for playing back music or providing telephone functionality through the speaker and microphone.

A display controller and display device 1030 can be used to provide a graphical user interface as discussed herein. Additionally, a wireless transceiver 1070 may be available to transmit and receive data via one or more wireless technologies, such as Wi-Fi, infrared, Bluetooth, or one or more variants of wireless cellular technology. One embodiment of system 1000 contains one or more camera devices 1040 configured in both a front and rear facing configuration, though similarly configured systems each with a front facing camera can be one of many optimal configurations. The data processing system 1000 can also include one or more input devices 1050 that allow a user to provide input to the system. Input devices can include a keypad or keyboard, alone or in conjunction with a touch or multi touch panel that is overlaid on the display device 1030. Additionally, embodiments of the data processing system 1000 can also include a device for providing location awareness services, such as a Global Positioning System (GPS) device 1060 or its equivalent.

It is to be noted that the data processing system 1000 as represented in FIG. 10 is by way of example. One or more buses or interfaces, which are not shown, can be used to interconnect the various components, as is well known in the art. As well, additional components, not shown, may also be part of the system 1000 in certain embodiments, and in certain embodiments fewer components than shown may also be used.

Figure 11:
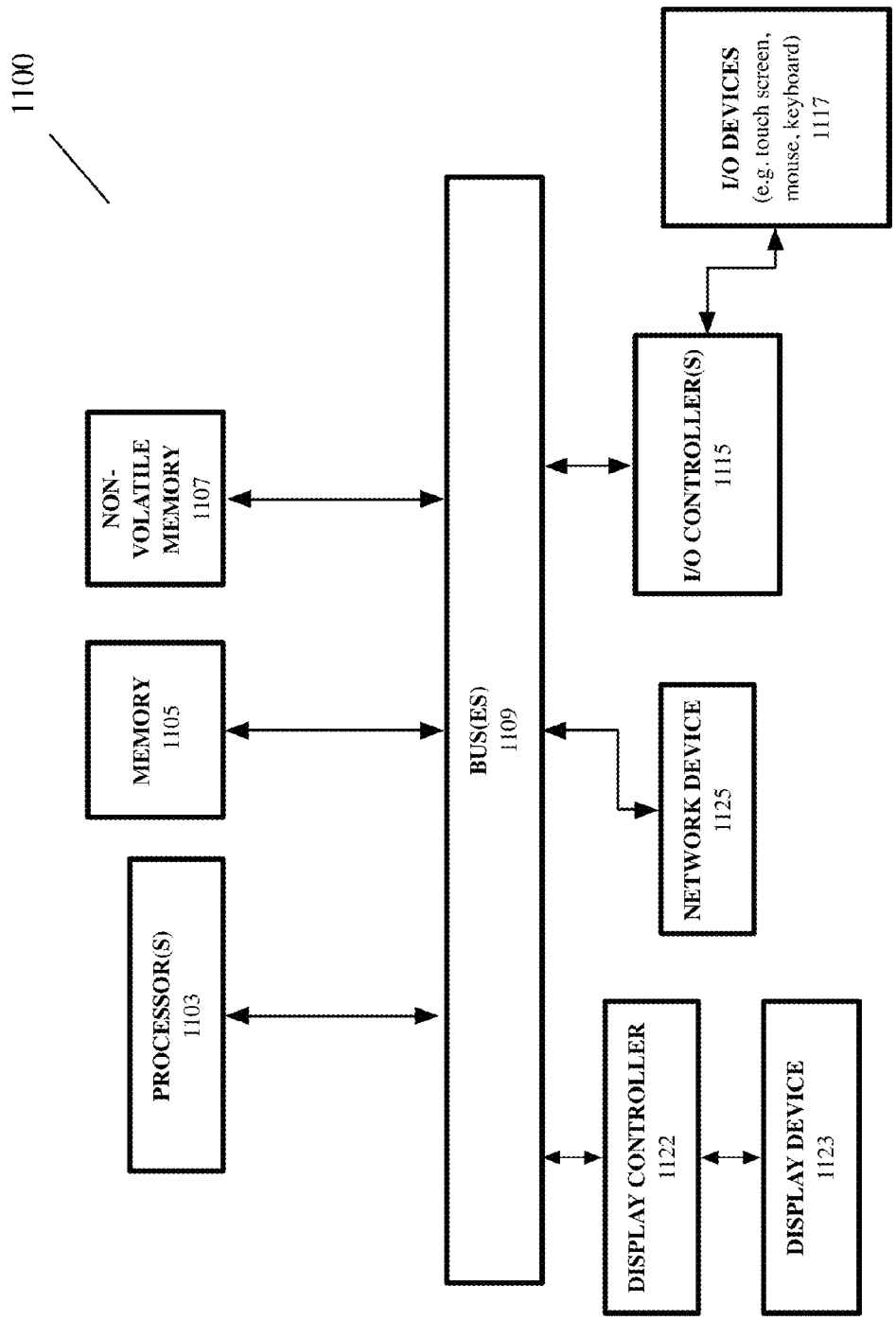
FIG. 11 is a block diagram illustrating an additional data processing system according to an embodiment.

FIG. 11 is a block diagram illustrating an additional data processing system, according to an embodiment. The exemplary data processing system illustrated can be any electronic data processing system, including a Macintosh computer such as a Mac Pro, iMac, or MacBook all from Apple Inc. of Cupertino, Calif. While FIG. 11 illustrates the various components of a data processing system, it is not intended to represent any particular architecture or manner of interconnecting the components as such details are not germane to the embodiments described. The data processing system 1100 includes one or more buses 1109, which serve to interconnect the various components of the system. One or more processors 1103, each containing one or more processor cores, are coupled to the one or more buses 1109 as is known in the art. Memory 1105 may be volatile Sequential DRAM, nonvolatile RAM or may be flash memory or other types of semiconductor memory. The memory 1105 is coupled to the one or more buses 1109 using techniques known in the art.

The data processing system 1100 can also include nonvolatile storage memory 1107 which may be a hard disk drive, flash memory, optical memory, other types of memory systems that maintain data after all power is removed from the system. The nonvolatile memory 1107 and the memory 1105 can both couple to the one or more buses 1109 using known interfaces and connection techniques. A display controller 1122 is coupled to the one or more buses 1109 in order to receive display data to be displayed on a display device 1123 which can display any one of the user interface features or embodiments described herein. The display device 1123 can include an integrated touch input to provide a touch screen. The data processing system 1100 can also include one or more input/output (I/O) controllers 1115, which provide interfaces for one or more I/O devices such as one or more mice, touch screens, touch pads, joysticks, and other input devices including those known in the art. The I/O controller can also provide interfaces for one or more output devices (e.g., speakers). The input/output devices 1117 are coupled through one or more I/O controllers 1115 as is known in the art. Additionally, one or more network interfaces 1125 can also be coupled to the one or more buses to provide access to one or more networks.

While FIG. 11 shows that the nonvolatile memory 1107 and the memory 1105 are coupled to the one or more buses directly rather than through a network interface, it will be appreciated that the data processing system can utilize a nonvolatile memory which is remote from the system, such as a network storage device which is coupled to the data processing system through a network interface such as a modem or Ethernet interface or wireless interface, such as a wireless Wi-Fi transceiver or a wireless cellular telephone transceiver or a combination of such transceivers. As is known in the art, the one or more buses 1109 may include one or more bridges or controllers or adapters to interconnect between various buses. In one embodiment, the I/O controller 1115 includes a USB adapter for controlling USB peripherals and can control an Ethernet port or a wireless transceiver or combination of wireless transceivers.

The techniques and methods described herein may be carried out in a data processing system in response to its processor executing a sequence of instructions contained in a volatile, non-transitory memory such as the memory 1105 or the non-volatile memory 1107 or a combination of such memories. In various embodiments, hardwired circuitry may be used in combination with software instructions, thus the techniques are not limited to any specific combination of hardware circuitry and software or to any particular source for the instructions executed by the data processing system.

Non-transitory machine readable storage medium comprises any type of machine readable storage medium, including floppy disks, flash memory devices, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, as opposed to media specifically designed or designated for carrying transitory, propagating signals. In various embodiments, software-instructions stored on a machine-readable storage medium can be used in combination with hardwired circuitry. Thus the techniques are not limited to any specific combination of hardware circuitry and software, or to any particular source for the instructions executed by the data processing system associated an apparatus for performing one or more of the operations described herein.

As described herein, if it is said that an element "A" is coupled to or with element "B," element A can be directly coupled to element B or be indirectly coupled through, for example, element C. When the specification or claims state that a component, feature, structure, process, or characteristic A "triggers," or "causes" a component, feature, structure, process, or characteristic B, it means that "A" is at least a partial cause of "B" but that there also can be at least one other component, feature, structure, process, or characteristic that assists in causing "B." If the specification or claim refers to "a" or "an" element, this does not mean there is only one of the described elements.

In one embodiment, the system described herein represents a classical property graph consisting of normal properties and a mix of two-way and one-way bindings. The classical property graph can be implicit in nature, where the implicit graph is represented explicitly as a directed acyclic graph made up of nodes which each perform some action. In one embodiment, triggering a node triggers all of the child nodes of the triggered node. Each child node is triggered through to the leaf nodes of the graph. Where a node is considered a truth node, the node is a node of the property designated as the most authoritative property of the graph, and the most upstream node of the graph. Where a first property (e.g., property A) is upstream of a second property (e.g., property B), property A is closer to truth than property B. Accordingly, property A's downstream node is a parent of property B's downstream node, and property B's upstream node a parent of property A's upstream node. Thus, when property A's downstream node is triggered, property B is also triggered, and when property B pushes data upstream, property A will receive it.

The specification and drawings are to be regarded in an illustrative rather than a restrictive sense. It will be evident that various modifications and changes can be made thereto, and it will be apparent to those skilled in the art that many further modifications and adaptations can be made. Accordingly, the scope of the embodiments is not to be determined by the specific examples provided above but only by the claims below.

What is claimed is:

1. A computer implemented method of binding a property within a data object, the method comprising:
   providing a first instance of the property, the first instance including a first upstream node and a first downstream node;
   providing a second instance of the property, the second instance bound to the first instance, the second instance including a second upstream node and a second downstream node;
   defining the second instance as a truth node, the truth node to store a truth, wherein the truth is an authoritative value of the property;
   at the first instance, receiving a message including a requested value for the property, and transmitting to the second instance a request to set the truth to the requested value via the first upstream node;
   at the second instance, receiving the request to set the truth to the requested value, setting the truth to the requested value, and transmitting a notification of the truth to the first instance via the second downstream node; and
   at the first instance, receiving the notification of the truth and in response to receiving the notification of the truth, setting an instance local value for the property to the truth.

2. The method of claim 1, further comprising:
   at the first instance, transmitting the notification of the truth to a third instance of the property, the transmitting responsive to the receiving of the notification from the second downstream node.

3. The method of claim 2, wherein the message including the requested value for the property is received from the third instance.

4. The method of claim 2, further comprising:
   at the third instance, receiving the notification of the truth and in response to receiving the notification of the truth, setting an instance local value for the property to the truth.

5. The method of claim 4, wherein the instance local value of the third instance is displayed via a user interface provided via an application framework.

6. The method of claim 4, wherein the instance local value of the third instance is stored on a server coupled to a client device via a network, and wherein the first and second instance is stored on the client device.

7. A non-transitory computer-readable medium including instructions, which when executed by one or more processors, cause the one or more processors to perform operations to bind a property within a data object, the operations comprising:
   receiving a message at a first instance of the property, the message including a requested value for the property, the first instance including a first upstream node;
   transmitting, to a second instance of the property, a request to set a truth for the property to the requested value via the first upstream node, wherein the truth for the property is an authoritative value of the property;
   receiving, at the second instance, the request to set the truth for the property to the requested value, the second instance including a second downstream node, wherein the second instance is defined as a truth node and the truth node is to store the authoritative value for the property;

setting the truth to the requested value and transmitting a notification of the truth to the first instance via the second downstream node; and receiving the notification of the truth at the first instance and in response to receiving the notification of the truth, setting an instance local value for the property to the truth.

8. The medium as in claim 7, wherein the second instance includes a second upstream node and the operations further comprise receiving the request to set the truth of the property at the second instance via the second upstream node.

9. The medium as in claim 7, wherein the first instance includes a first downstream node and the operations further comprise receiving the notification of the truth of the property at the first instance via the first downstream node.

10. The medium of claim 9, wherein the property is within a data object of an application framework.

11. The medium of claim 10, wherein the message including the requested value for the property is received in response to a change at a user interface.

12. The medium of claim 10, wherein the message including the requested value for the property is received in response to a request to programmatically change the value of the property from a resource that is bound to the property.

13. The medium of claim 10, wherein the first downstream node is stored on a server coupled to a client device via a network.

14. The medium of claim 13, wherein the first downstream node is associated with a property in a key-value store on the server.

15. A data processing system including memory and one or more processors to bind a property within a data object, the system comprising:
a first instance of the property including a first upstream node and a first downstream node; and
a second instance of the property bound to the first instance, the second instance including a second upstream node and a second downstream node, wherein the second instance of the property is defined as a truth node, wherein the truth node to store a truth and the truth is an authoritative value of the property;
wherein the first instance is to receive a message including a requested value for the property and transmit a request to set the truth to the requested value to the second instance via the first upstream node;
wherein the second instance is to receive the request to set the truth to the requested value for the property, set the truth to the requested value, and transmit a notification of the truth to the first instance via the second downstream node; and
wherein the first instance is further to receive the notification of the truth and set an instance local value for the property to the truth in response to receipt of the notification of the truth.

16. The system as in claim 15, further comprising a third instance of the property including a third downstream node, wherein the first instance of the property is further to transmit the notification of the truth to the third downstream node in response to receipt of notification of truth and the third instance of the property to further to set the instance local value for the third instance of the property to the truth in response to receipt of notification of the truth.

17. The system of claim 15, wherein the property if a resource of an application framework.

18. A data processing system comprising:
a memory to store instructions;
one or more processors coupled with the memory to process the instructions to:
provide a first instance of a property within a data object, the first instance including a first upstream node and a first downstream node;
provide a second instance of the property, the second instance bound to the first instance, the second instance including a second upstream node and a second downstream node;
define the first instance of the property as a truth node, the truth node to store a truth, wherein the truth of the property defines an authoritative value of the property;
receive, from the second instance of the property, a request to change a value of the property at an upstream node of the first instance of the property;
change the value of the property at the first instance and propagate the value to the second instance via a downstream node of the first instance, wherein the change of the value of the property at the first instance changes the truth of the property;
receive notification of the truth at a downstream node of a second instance of the property from the first instance and set an instance local value for the second instance of the property to the truth in response to receipt of the notification of the truth.

19. The system as in claim 18, wherein the one or more processors are further to transmit the notification of the truth to a downstream node of a third instance of the property in response to receipt of notification of truth, the third instance of the property to set the instance local value for the third instance of the property to the truth in response to receipt of the notification of the truth.

20. The system of claim 18, wherein the property is a resource of an application framework, the data processing system is a client device and the truth is propagated via the downstream node of the first instance to a downstream node of a third instance of the property that is stored on a server coupled to the client device via a network, the third instance of the property associated with a key-value store on the server.

* * * * *